(12) United States Patent
Tomooka et al.

(10) Patent No.: US 8,907,781 B2
(45) Date of Patent: Dec. 9, 2014

(54) INTRUSION DETECTION DEVICE

(75) Inventors: Hiroyuki Tomooka, Otsu (JP);
Katsutoshi Tatsuoka, Otsu (JP)

(73) Assignee: Optex Co., Ltd., Shiga (JP)

( * ) Notice: Subject to any disclaimer, the term of this patent is extended or adjusted under 35 U.S.C. 154(b) by 430 days.

(21) Appl. No.: 13/188,044

(22) Filed: Jul. 21, 2011

(65) Prior Publication Data
US 2011/0273285 A1 Nov. 10, 2011

Related U.S. Application Data

(63) Continuation of application No. PCT/JP2009/007305, filed on Dec. 25, 2009.

(30) Foreign Application Priority Data

Jan. 22, 2009 (JP) .................. 2009-011599

(51) Int. Cl.
*G08B 1/08* (2006.01)

(52) U.S. Cl.
USPC ............ 340/539.1; 340/541; 340/545.3; 340/555; 340/540; 340/539.11

(58) Field of Classification Search
USPC ............ 340/541, 545.3, 555, 540, 506; 250/221, 222.1, 341.8
See application file for complete search history.

(56) References Cited

U.S. PATENT DOCUMENTS

| | | | |
|---|---|---|---|
| 4,437,089 A | 3/1984 | Achard | |
| 5,283,549 A | 2/1994 | Mehaffey et al. | |
| 5,578,988 A * | 11/1996 | Hoseit et al. | 340/522 |
| 5,703,368 A | 12/1997 | Tomooka et al. | |
| 5,959,529 A * | 9/1999 | Kail, IV | 340/539.12 |
| 6,172,612 B1 | 1/2001 | Odachowski | |
| 6,522,252 B2 * | 2/2003 | Horibe et al. | 340/544 |
| 6,833,788 B1 | 12/2004 | Smith et al. | |
| 7,075,431 B2 | 7/2006 | Buckley et al. | |

(Continued)

FOREIGN PATENT DOCUMENTS

| | | |
|---|---|---|
| DE | 3803277 A1 | 8/1989 |
| JP | 08-016938 A | 1/1996 |

(Continued)

OTHER PUBLICATIONS

European Communication; Application No. 09 838 751.7-1803; May 2, 2013.

(Continued)

*Primary Examiner* — Daryl Pope
(74) *Attorney, Agent, or Firm* — Sughrue Mion, PLLC

(57) ABSTRACT

To provide an intrusion detecting device of a type in which a battery for supplying an electric power to both of the main unit and the transmitter is provided in a unit holder for holding the main unit, including the detecting element, to thereby increase the overall electric power capacity needed in the intrusion detecting device as a whole and, also, replacement of those batteries can be accomplished easily, the intrusion detecting device includes a main unit (1) including a detecting element (30), a battery (Ba) detachably mounted on the main unit (1) for supplying an electric power to the main unit (1), and a power supply line (18) fitted to the main unit (1) for supplying an electric power to a wireless transmitter (11) for transmitting wireless an output signal of the main unit (1).

15 Claims, 12 Drawing Sheets

(56) References Cited

U.S. PATENT DOCUMENTS

| | | |
|---|---|---|
| 7,091,844 B2 | 8/2006 | Rolf et al. |
| 7,106,193 B2 * | 9/2006 | Kovach ................. 340/541 |
| 7,209,729 B2 | 4/2007 | Oyagi et al. |
| 2004/0110544 A1 | 6/2004 | Oyagi et al. |
| 2007/0103330 A1 | 5/2007 | McGrath |

FOREIGN PATENT DOCUMENTS

| | | |
|---|---|---|
| JP | 10-269474 A | 10/1998 |
| JP | 2000-048268 A | 2/2000 |
| JP | 2000-149896 A | 5/2000 |
| JP | 2001-210291 A | 8/2001 |
| JP | 2002159142 A | 5/2002 |
| JP | 2002-305577 A | 10/2002 |
| JP | 2005-221455 A | 8/2005 |
| JP | 2005-267436 A | 9/2005 |
| JP | 2006-134842 A | 5/2006 |
| JP | 2007-199884 A | 8/2007 |

OTHER PUBLICATIONS

Notification of Transmittal of Copies of Translation of the International Preliminary Report on Patentability, for PCT/JP2009/007305; Aug. 18, 2011.

European Search Report Application No. 09838751.7-1232/2390855 PCT/JP2009007305; Sep. 14, 2012.

European Search Report for Application No. 09838751.7-1232/2390855; Sep. 14, 2012.

Japanese Office Action issued in JP Application No. 2010-547322 dated Feb. 4, 2014.

Summons to attend oral proceedings pursuant to Rule 115(1) EPC, dated Feb. 20, 2014, issued in corresponding European patent application No. 09838751.7.

* cited by examiner

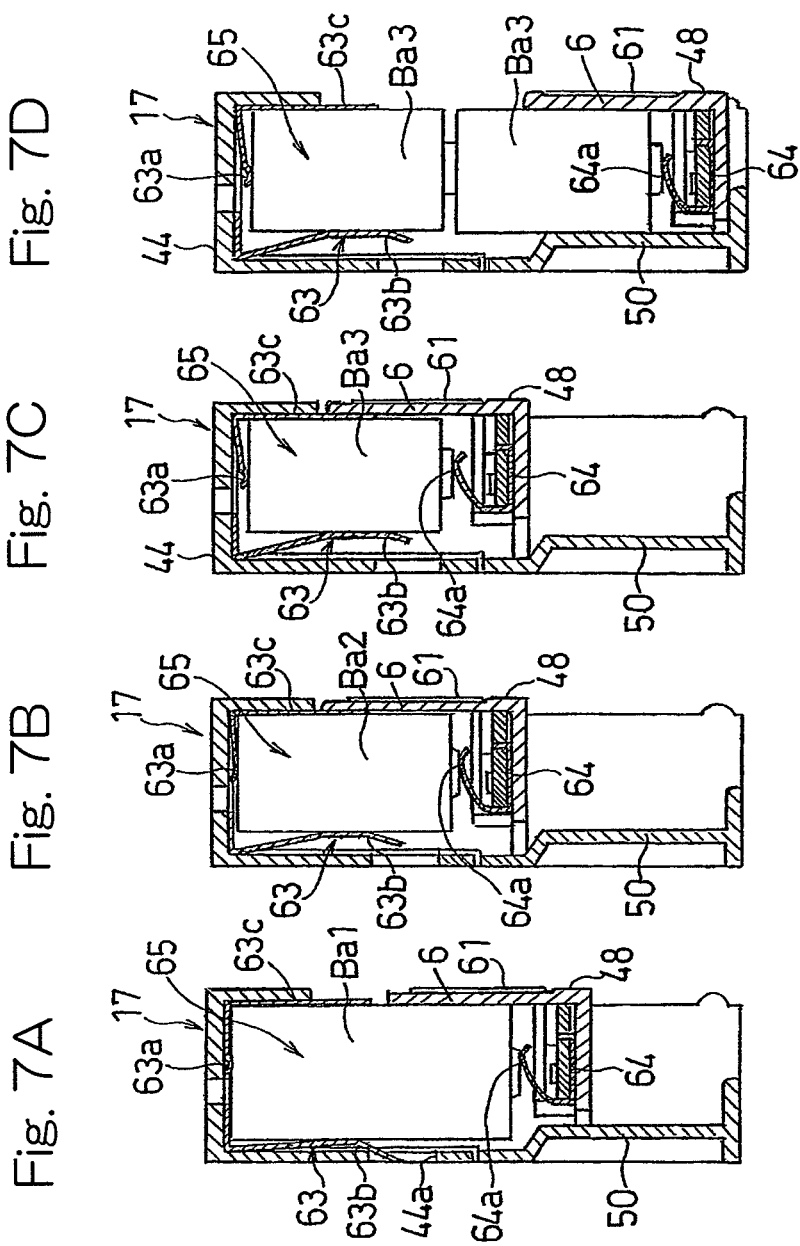

INTRUSION DETECTION DEVICE

CROSS REFERENCE TO THE RELATED APPLICATION

This application is a continuation application, under 35 U.S.C. §111(a) of international application No. PCT/JP2009/007305, filed Dec. 25, 2009, which claims priority to Japanese patent application No. 2009-011599, filed Jan. 22, 2009, the entire disclosure of which is herein incorporated by reference as a part of this application.

BACKGROUND OF THE INVENTION

1. Field of the Invention

The present invention relates to an intrusion detection device for detecting an unauthorized object such as, for example, a human body illegally intruding into a predetermined warning area.

2. Description of Related Art

It is well known that the standard intrusion detecting device of the kind referred to above generally employs a main unit including a detecting element, which main unit is so designed and so configured as to make use of either a passive infrared ray (PIR) detection system or an active infrared ray (AIR) detection system.

Also, in recent years, the intrusion detecting device has been suggested, in which a wireless system is employed to enable an intrusion detection signal to be transmitted from a wireless transmitter to a wireless receiver of a control device to thereby eliminate the need to use any wiring between the control device and the transmitter. In this type of the intrusion detecting device, a commercially available transmitter is employed for the wireless transmitter and an electric driving power is occasionally supplied from a power source battery, built in the wireless transmitter, to the main unit. In such case, the capacity of the electric power needed in the intrusion detecting device as a whole depends on the battery built in the wireless transmitter employed. Also, in the event that wastage of the battery in the wireless transmitter is detected, a signal indicative of the power wastage is transmitted wireless to the receiver so that the latter can issue an audible and/or visible warning. It is to be noted that, regarding the battery used in this way, a battery storage casing has been suggested, which is of a design capable of accommodating batteries of various different sizes (such as disclosed in, for example, the Patent Document 1 listed below).

PRIOR ART LITERATURE

[Patent Document 1] JP Laid-open Patent Publication No. 2000-149896

Since in the conventional intrusion detecting device having the transmitter, the battery built in the transmitter has a relatively low capacity and is concurrently used as a power source for the main unit, the battery in the transmitter is apt to be quickly drained and, therefore, frequent replacement of the battery is needed. Yet, when it comes to replacement of the battery, the transmitter is needed to be first removed from the detection system itself, followed by removal of the battery from the transmitter, thus requiring complicated and time-consuming labors and time. Considering that the frequent replacement of the battery is needed as discussed above, this is indeed embarrassing.

In view of the foregoing, it may be contemplated to use, in addition to the use of a battery dedicated to drive the transmitter, an additional battery for use in supplying an electric power to the main unit so that those batteries can be usable for a prolonged period of time and, also, the frequency of battery replacement can be reduced. It has, however, been found that where thus idea of using the separate batteries for the transmitter and the main unit, respectively, is embodied in the standard intrusion detecting device of the kind discussed hereinabove, the result would be that the power wastage of the battery in the transmitter can be detected and the signal indicative of it can be transmitted wireless to the main unit, but no power wastage of the battery in the main unit will be detected in anyway whatsoever.

SUMMARY OF THE INVENTION

In view of the foregoing, the present invention has for its object to provide an intrusion detecting device of a type in which a battery for supplying an electric power to both of the main unit and the transmitter is provided in a unit holder for holding the main unit, including the detecting element, to thereby increase the overall electric power capacity needed in the intrusion detecting device as a whole and, also, replacement of those batteries can be accomplished easily.

In order to accomplish the foregoing object of the present invention, there is provided an intrusion detecting device which includes a main unit including a detecting element, a battery detachably mounted on the main unit for supplying an electric power to the main unit, and a power supply line for supplying an electric power to a wireless transmitter for transmitting wireless an output signal of the main unit. The wireless transmitter is adapted to be mounted on the main unit.

According to the intrusion detecting device of the structure described above, since an electric power is supplied from the battery, mounted on the main unit, to the main unit and also to the transmitter through the power supply line, the electric power source capacity of the device as a whole increases and, in consistency therewith, the battery can have a long lifetime. Also, since the battery is removably mounted on the main unit, not within the transmitter, replacement can be easily accomplished. In addition, power consumption of the main unit can be detected by detecting a consumption of an electric power of the transmitter.

In the present invention, the intrusion detecting device of the type discussed above may further include a dummy battery having an electrically insulating property, the dummy battery being adapted to be fitted to a battery mount of the transmitter together with the power supply line in place of a battery for the transmitter. According to this construction, the power supply line for supplying the electric power from the battery therethrough to the transmitter can be easily and stably connected with contacts in the battery mount of the transmitter by means of a dummy battery fitted in the battery mount of the transmitter. In such case, for example, either a first structure, in which a pair of contact pieces fitted to free ends of the power supply lines are sandwiched between the dummy battery and the contacts of the battery mount, or a second structure, in which a terminal fitted dummy body, including a dummy battery having opposite electrode terminals fitted thereto, is jointed and hence integrated with the free ends of the electric power supply lines and this terminal fitted dummy body is then fitted to the contacts of the battery mount, can be employed.

In the case where the above described first structure is employed, the dummy battery preferably has a length set to a value smaller than the battery of the transmitter. According to this construction, when the contact pieces fitted to the free ends of the positive and negative power supply lines are urged against and then electrically connected with the positive and negative electrode terminals upon mounting of the dummy battery, it is possible to avoid the possibility that excessive pressing forces may act on the contact pieces and the positive and negative electrode terminals.

In the case where the above described first structure is employed, the dummy battery may be telescopically expandable in a direction lengthwise thereof. According to this construction, when after the dummy battery in a contracted condition has been pushed into the battery mount, for example, the dummy battery is allowed to expand by the effect of a restoring force of an elastic element then constrained, the contact piece fitted to the free end of each of the positive and negative power supply lines can be pressed to contact the positive or negative electrode terminal and, therefore, the dummy battery can be stably fitted to the battery mount.

In the case where the second structure is employed, the power supply line and the dummy battery may be jointed together and be hence integrated with each other by forming the dummy battery with a resinous material by the use of any known insert molding technique.

In the present invention, a contact piece capable to be connected with a battery of the transmitter may be fitted to the power supply line. According to this construction, since any ordinary battery of the transmitter can be employed with no alternation applied thereto, the dummy battery can be dispensed with and the electric power source capacity can increase by a quantity corresponding to the ordinary battery.

In the present invention, the intrusion detecting device may further include a base body for detachably retaining the main unit and a lens detachably fitted to the base body for covering a front surface of the main unit. According to this construction, when the battery runs out, the drained batter then mounted on the main unit, can be replaced with a fresh battery merely by removing the main unit, then retained within the base body, after the lens fitted covering has been removed from the base body, and then loading the fresh battery in the main unit. Therefore, the replacement of the battery can be easily and quickly accomplished.

In the present invention, the intrusion detecting device is preferably provided with a battery box for holding the battery. According to this construction, where a plurality of batteries are provided, those battery, when placed within and retained by the battery box, can be easily mounted on the unit holder in a required connected fashion.

In the structure in which the battery box is provided, the battery box is preferably detachably mounted on a rear surface of the main unit. According to this construction, since after the battery box has been removed from the main unit, the battery retained within such battery box can be replaced with a fresh battery, the replacement of the battery can be further facilitated.

In the structure in which the battery box is detachably mounted on the rear surface of the main unit, the battery box is preferably positioned in side-by-side relation with the transmitter when at a first mounting position, but when at a second mounting position, defines a mounting space, defined between the battery box and the rear surface, for the transmitter at a location spaced from a rear surface of the main unit. According to this construction, particularly where a transmitter selected from various commercially available transmitters is employed, the battery box to be fitted to the main unit together with the transmitter can be fitted by selecting one of a plurality of mounting positions of the main unit, which will not interfere with the fitting of the transmitter regardless of whether the selected transmitter is large in shape or whether the selected transmitter is small in shape. In other words, if the transmitter to be fitted is small in shape, fitting of the battery box to the first mounting position on the rear surface of the main unit is effective to facilitate the fitting of the transmitter to the rear surface of the main unit at a dimensionally low position where the battery box and the transmitter are positioned in side-by-side relation or juxtaposed to each other. On the other hand, if the transmitter to be fitted is large in shape, fitting of the battery box to the second mounting position is effective to secure between the battery box and the rear surface of the main unit, the mounting space in which the transmitter large in shape can be fitted, and, therefore, the transmitter can be neatly fitted to the rear surface of the main unit together with the battery box in a partially overlapped relation.

In the structure in which the battery box is provided, the main unit is preferably provided with an engagement element, in which case the battery box is provided with a to-be-engaged element engageable with the engagement element. According to this construction, selective engagement or disengagement between the engagement element and the to-be-engaged element allows the battery box to be easily mounted or dismounted and, therefore, replacement of the battery can be facilitated.

In the structure in which the battery box is provided, the battery box is preferably capable of accommodating a plurality of batteries of different diameters or lengths. According to this construction, even though the batteries to be used have different diameters or lengths, a common battery box can be utilized.

In the structure in which the battery box is capable of retaining batteries of a plurality of types, the battery box may include a spring element for applying a biasing force to the battery in a direction radially of such battery and a retaining piece for retaining the battery against the biasing force in a direction radially thereof. According to this construction, even where the batteries of the different diameters are to be mounted on the same battery box, those batteries can be stably retained therein with each battery resiliently sandwiched between a spring element and a retaining piece from opposite directions radially of the respective battery.

In the structure in which the battery box is provided, the battery box preferably includes a repositionable contact holder, having a contact engageable with one of electrodes of the battery, for selectively fitted at one of a plurality of different positions in a direction lengthwise of the battery for accommodating one of batteries of different lengths. According to this construction, even where the battery of a different length is to be mounted on the same battery box, positioning of the repositionable contact holder selectively at a position corresponding to the length of the battery in the battery box allows the opposite electric poles of the battery to be stably connected with the contact of the battery box and the contact of the repositionable contact holder.

The repositionable contact holder preferably includes a contact member having the contact and an anchoring member for selectively engaging a battery receptacle of the battery box at one of the plurality of the different positions in the lengthwise direction. According to this construction, if the anchoring portion of the repositionable contact holder is fixed to a portion of the battery receptacle of the battery box which corresponds to the length of the battery, opposite electric poles of the battery can be stably electrically connected with the contact of the battery box and the contact of the contact member.

In the structure in which the repositionable contact holder includes the contact member and the anchoring member, the anchoring member is preferably prepared from a generally U-shaped plate member and preferably include an anchoring portion fitted to the repositionable contact holder, and a pair of legs extending from opposite ends of the anchoring portion in a direction perpendicular to the anchoring portion and in which each of the legs is formed with a hook portion at a free end thereof, the anchoring portion is positioned on a front surface side of the battery receptacle and the hook portion is engaged with a corner area in a rear surface of the battery receptacle. According to this construction, the anchoring member having the anchoring portion, the pair of the legs and the hooks can be easily manufactured merely by bending a single plate member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 7A to 7D are longitudinal sectional views showing how the battery box shown in FIG. 6A accommodates therein batteries of different sizes, respectively;

DESCRIPTION OF THE PREFERRED EMBODIMENTS

Hereinafter, the details of a preferred embodiment of the present invention will be described with reference to the accompanying drawings.

Figure 1:
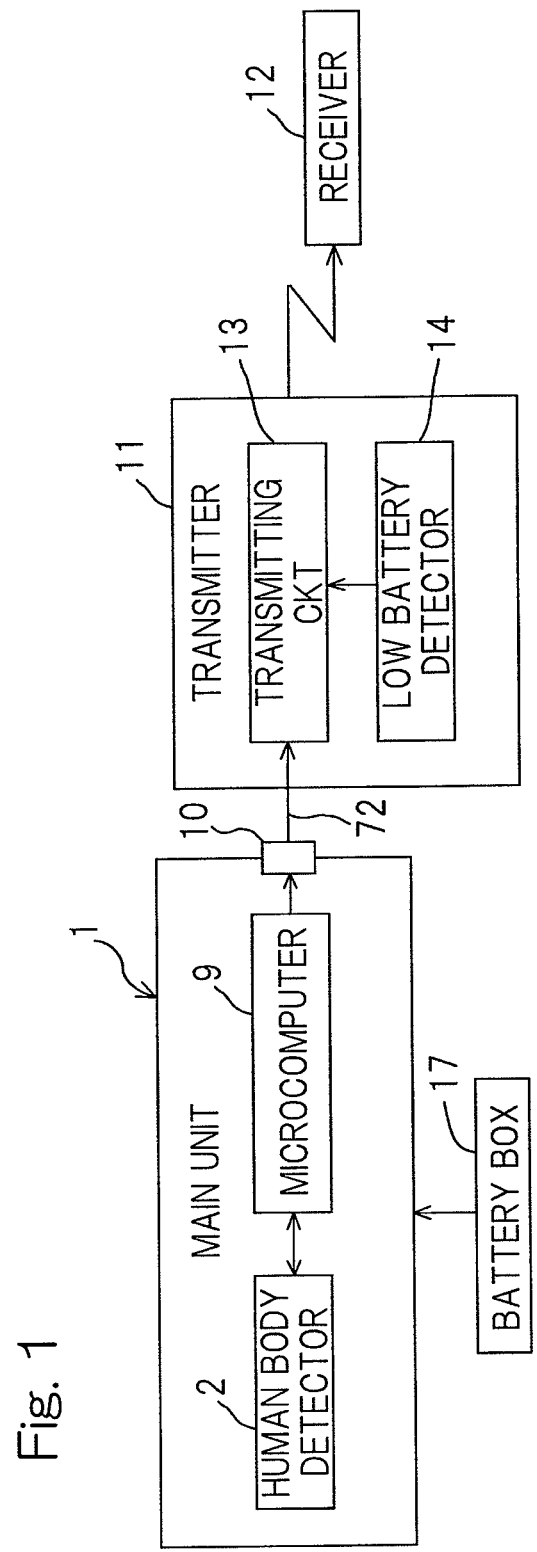
FIG. 1 is a circuit block diagram showing an electric signal system employed in an intrusion detecting device in accordance with a preferred embodiment of the present invention.

Referring first to FIG. 1 showing a circuit block diagram of an electric signal system employed in the intrusion detecting device of the present invention, a main unit 1 includes a human body detector 2 of a passive infrared ray detecting system made up of an infrared detector element for detecting infrared rays of light, emanating from a human intruder who is entering a warning area with no authorization, and operable to output a human body detection signal in the event that an electrical signal indicative of the quantity of the infrared rays of light detected by such detector element attains a value higher than a predetermined level, and a microcomputer 9 for controlling the main unit 1 in its entirety. The microcomputer 9 outputs a human body detection signal from an output terminal 10 through a signal line 72 to a transmitter 11 when the human body detector 2 detects the a human body of the unauthorized intruder. The wireless transmitter 11 includes a wireless transmitting circuit 13 for wireless transmitting an alarm signal in the event that the human body detection signal is inputted thereto from the main unit 1 and a low battery detector 14 operable to detect a wastage of a replaceable power source as will be described later and then to output a wastage detection signal to the transmitting circuit 13. The alarm signal or the wastage detection signal transmitted wireless from the wireless transmitter 11 is received by a receiver 12 installed within, for example, a building.

A power supply system employed in the intrusion detecting device of the structure described above is schematically shown in FIG. 2. The replaceable power source referred to above and employed in the practice of the present invention for providing an electric power needed to drive the intrusion detecting device made up of the main unit 1 and the wireless transmitter 11 may be a battery. In the intrusion detecting device, a plurality of batteries are accommodated neatly within a battery box 17. The main unit 1 has an electric connector terminal 3 including, inter alia, positive and negative power input terminals 21 and 22 and positive and negative power output terminals 23 and 24. On the other hand, the battery box 17 has positive and negative battery terminals 19 and 20, which are electrically connected through respective power supply lines 15 and 15 with the positive and negative electric power input terminals 21 and 22 of the connector terminal 3 in the main unit 1, and the positive and negative electric power output terminals 23 and 24 of the connector terminal 3 in the main unit 1 are electrically connected with positive and negative power source terminals of the wireless transmitter 11 through respective power supply lines 18 and 18.

If desired, in place of the power lines 15 and 15, the use may be made of connection terminals such that the battery box 17 can be connected respectively with the positive and negative power input terminals 21 and 22 through such connection terminals. As will be described in detail later, respective ends of the power supply lines 18 and 18 remote from the main unit 1 are connected with power terminals of the wireless transmitter 11 through a dummy battery 28.

Figure 3:
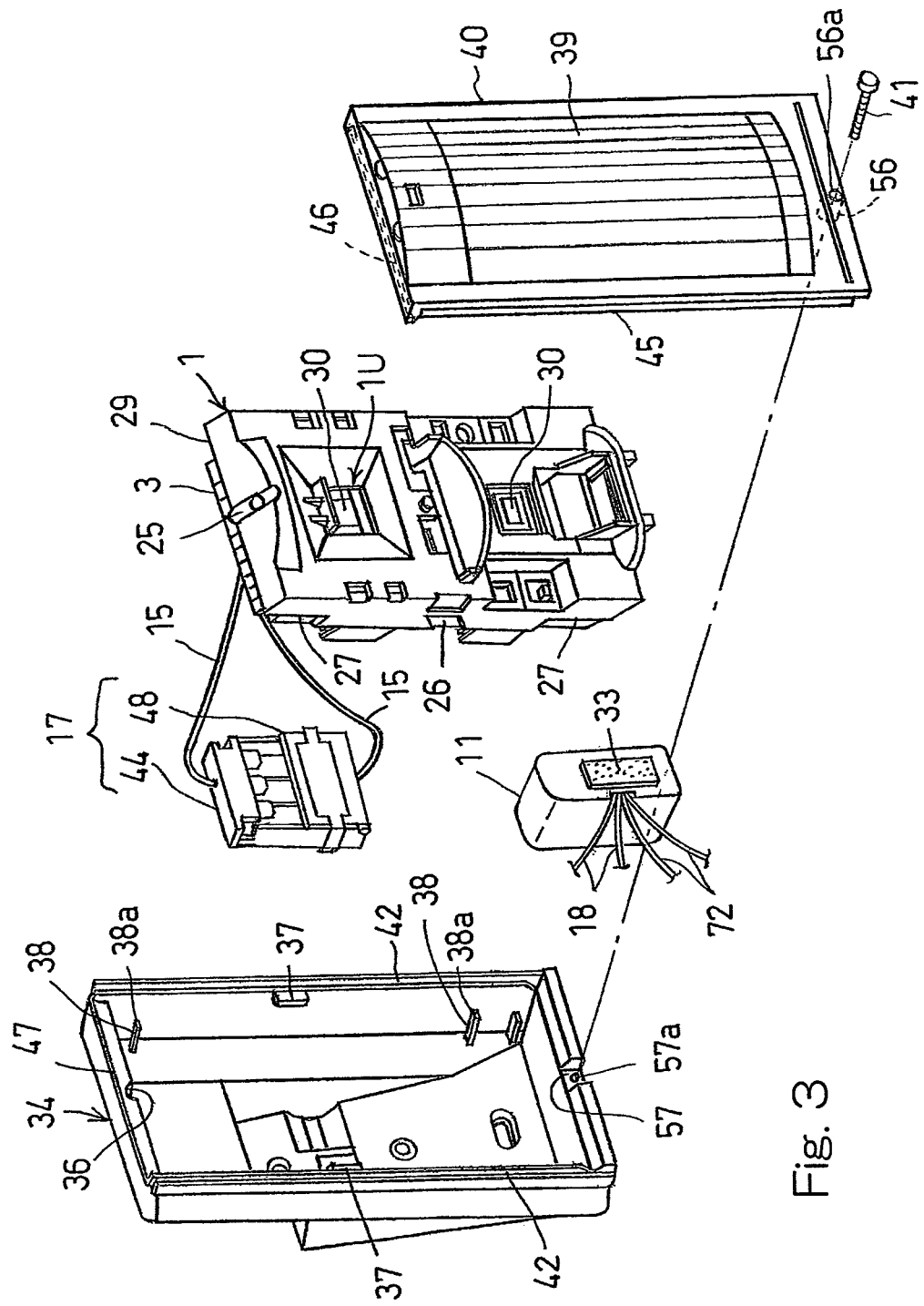
FIG. 3 is an exploded perspective view showing the intrusion detecting device.

FIG. 3 illustrates an exploded perspective view of the intrusion detecting device referred to above. As shown therein, the main unit 1, referred to above with reference to FIG. 1, is comprised of a generally rectangular unit holder 29 made of a resinous material and a unit body 1U retained within the unit holder 29. The unit body 1U includes a printed circuit substrate as will be detailed later, and electronic components including two PIR sensors 30 and 30, which form respective parts of the detecting element employed in the human body detector 2 referred to previously, are mounted on upper and lower surfaces of the printed circuit substrate in the unit body 1U. Specifically, the PIR sensors 30 and 30 are mounted on the front surface of the printed circuit substrate so as to be exposed forwardly from the unit body 1U, that is, forwardly of the main unit 1 (in a direction forwardly of the drawing of FIG. 3).

The wireless transmitter 11 is mounted on a rear surface of the unit holder 29 and is immovably held in position by means of a releasable strap 23 such as, for example, a commercially available releasable fastening strap trademarked "Magic Tape" or "Velcro Strap". With the wireless transmitter 11 held on the unit holder 29 in the manner described above, the power supply lines 18 and 18 and signal feed lines 72 and 72 are connected with the terminal connection 9 provided on the unit holder 29. Although the battery box 17 referred to previously is also mounted on the unit holder 29, the details thereof will be described later.

The unit holder 29 is detachably accommodated and retained in position within a generally rectangular base body 34 together with the battery box 17 and the transmitter 11 that are mounted on the rear surface of the unit holder 29. More specifically, when the unit holder 29 is positioned within the base body 34 with a guide projection 25 at an upper face thereof received within a guide recess 36 defined in a corresponding upper portion of the base body 34, a pair of engagements 37 in the form of, for example, engagement claws formed in opposite side faces of the base body 34 are engaged with respective engaging members 26 in the form of engagement projections defined in opposite side portions of the unit holder 29 at corresponding locations intermediate of the height of the unit holder 29 as viewed in FIG. 3. Upon completion of the unit holder 19 received within the base body 34 in the manner described above, four projecting support pieces 38 formed within the base body 34 have their end faces 38a brought into contact with corresponding steps 27 defined in the opposite side portions of the unit holder 29 at respective locations aligned with the projecting support pieces 38.

In this way, the unit holder 29 is detachably accommodated within the base body 34. If the unit holder 29 is forcibly pulled in a direction away from the base body 34 with a strong force applied thereto, the engaging members 26 are disengaged from the respective engagements 37 to allow the unit holder 29 to be separated from the base body 34.

The base body 34 having the unit holder 29 retained therein has a front surface to which is mated a lens-fitted covering lid 40 including, for example, a Fresnel lens 39 of a generally rectangular shape, which covering lid 40 is removably fitted to the base body 34 by means of a set screw 41. Specifically, the lens-fitted covering lid 40 has its opposite side faces formed with respective protruding engagement pieces 45 so as to protrude rearwardly thereof towards the base body 34, and the base body 34 has its opposite side walls formed with respective engagement grooves 42. The engagement pieces 45 are engaged with the corresponding engagement grooves 42. The base body 34 also has an engagement piece 46, formed on a rear face of an upper end portion thereof, and a boss 56 formed on a rear face of a lower end portion thereof. When in a condition with the engagement piece 46 engaged with a rear face of an engagement projection 47 formed in an upper end portion of the base body 34 in such a manner as clearly shown in FIG. 14A, the boss 56 at the rear face of the lower end portion of the lens-fitted covering lid 40 is engaged into an engagement recess 57 defined in a lower end portion of the base body 34.

By so doing, the lens-fitted covering lid 40 is so immovably retained in position relative to the base body 34 that it will neither move nor displace in any directions, leftwards or rightwards, upwards or downwards, relative to the base body 34. Finally, the set screw member 41 is passed through the boss 56 at the lower end portion of the covering lid 40 and then threaded into an internally threaded hole 57a defined in the engagement recess 57 in the lower end portion of the base body 34, thereby completing fixing the covering lid 40 to the base body 34.

Figure 4:
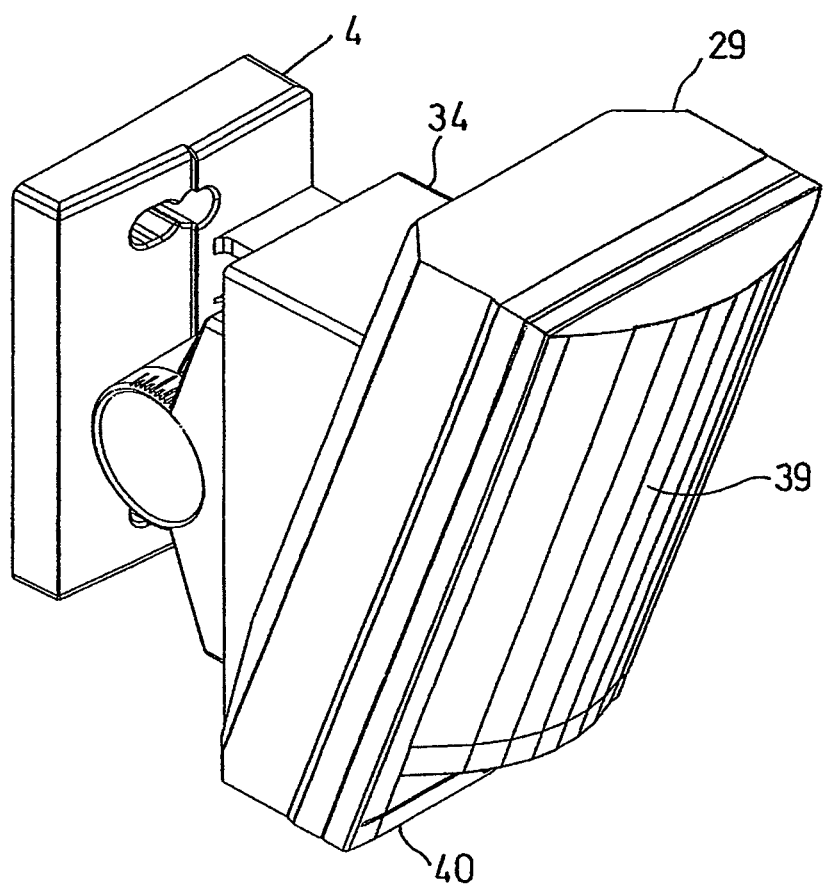
FIG. 4 is a schematic perspective view showing the intrusion detecting device.

After the assemblage of the intrusion detecting device as hereinabove described, the resultant assembly assume such a position as shown in FIG. 4 and the intrusion detecting device is adapted to be secured to any suitable support member such as, for example, a house wall or pillar through a bracket 4 fixed to a rear surface of the base body 34.

When during the use of the intrusion detecting device, a wastage detection signal indicative of the wastage of an electric power accumulated in the replaceable power source, i.e., the batteries Ba is transmitted wireless from the wireless transmitter 11 to the receiver 12 as shown in FIG. 1, the lens-fitted covering lid 40 can readily be removed from the base body 34 merely by undoing the set screw member 41 best shown in FIG. 3 while the intrusion detecting device in a condition as shown in FIG. 4. After the removal of the covering lid 40 from the base body 34, the unit holder 29 can readily be removed from the base body 34, followed by removal of the battery box 17 from the unit holder 29 in readiness for replacement of some or all of the batteries Ba forming the replaceable power source that has run out.

Figure 5:
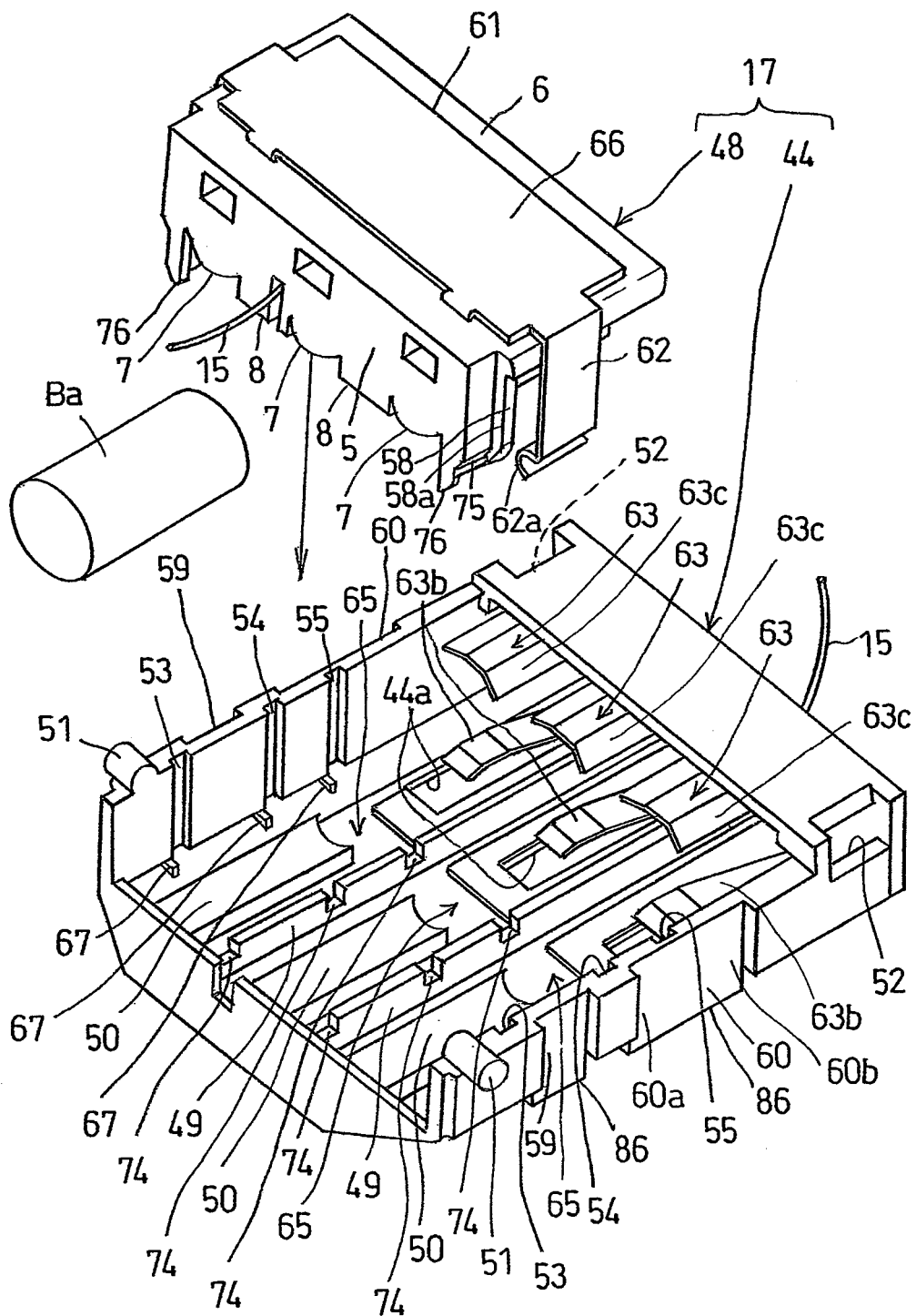
FIG. 5 is an exploded perspective view showing a battery box employed in the intrusion detecting device.

The details of the battery box 17 will now be described with reference to FIG. 5 showing an exploded perspective view thereof. As shown therein, battery box 17 includes a battery receptacle 44 for accommodating at least one battery Ba therein, and a repositionable contact holder 48 detachably mounted on the battery receptacle 44 and capable of selectively assuming one of a plurality of positions on the battery receptacle 44 to enable the battery box 17 to selectively accommodate batteries of different sizes or capacity. The battery receptacle 44, so far as employed in the battery box 17 shown in FIG. 5, is so designed as to accommodate, for example, three batteries Ba in side-by-side fashion and does accordingly have its interior divided into three battery compartments 65 by means of two guide walls 49.

A battery support bed 50 for supporting from below the corresponding battery Ba when the latter is placed thereon is formed in one end portion (in a left end side in FIG. 5) of each of those three battery compartments 65 and a negative terminal member 63 is disposed in the opposite end portion of the battery receptacle 44, the details of the negative terminal member 63 being described later. Also, the battery receptacle 44 has a pair of side walls perpendicular to a plane, in which the battery support beds 50 are formed, and is integrally formed with projections 51 and 51 so as to protrude laterally outwardly from respective end portions of those side walls while engagement holes 52 and 52 are formed respectively in the opposite end portions of those side walls. Those projections 51 and the engagement holes 52 form respective to-be-engaged members of the battery box 17.

The opposite side walls of the battery receptacle 44 have respective inner surfaces each formed with three spaced guide grooves 53, 54 and 55 in a fashion with the guide grooves 53 to 55 in one of the side walls aligned with the guide grooves 53 to 55 in the other of the side walls and also have respective outer surfaces each formed with two spaced guide recesses 59 and 60. Also, the battery receptacle 44 has an inclined face positioned between each of the side wall inner surfaces and an inner bottom surface of the battery receptacle 44, which inclined face is formed with three engagement pieces 67 in the vicinity of respective lower ends of the three guide grooves 53, 54 and 55 adjacent the inner bottom surface of the battery receptacle 44. On the other hand, the afore-mentioned two guide walls 49 intermediate between the opposite side walls of the battery receptacle 44 are formed with engagement cutouts 74 that are positioned substantially in alignment with the engagement pieces 67.

The repositionable contact holder 48 referred to previously is of a generally L-shaped configuration, when viewed in a longitudinal sectional view, and includes an end wall 5 and a lid member 6 extending from one end of the end wall 5 at right angle thereto. This end wall 5 of the contact holder 48 has opposite side faces each formed with a guide rail 58 that is selectively engageable in one of the guide grooves 53, 54 and 55 in the corresponding side wall of the battery receptacle 44, a stepped area 75 adjoining a tip end face of the respective guide rail 58, and an engagement projection 76 protruding downwardly from one end of the respective stepped area 75. Also, the end wall 5 has an end face formed with downwardly protruding wall segments 7 each engageable snugly in an arcuately curved groove of the respective battery support bed 50, and linear engagement edges 8 each selectively engageable in one of the three engagement cutouts 74 defined in each of the guide walls 49.

The lid member 6 has mounted thereon an anchoring member 61 of a generally U-shaped configuration prepared from a generally rectangular metal plate by the use of any known bending technique so as to have a substantially planar anchoring portion 66, fixed to an outer surface of the lid member 6, and a pair of legs 62 extending from opposite ends of the planar anchoring portion 66 so as to extend in respective direction perpendicular to the planar anchoring portion 66 and positioned adjacent the respective guide rails 58. Respective free ends of the legs 62 remote from the planar anchoring portion 66 are formed integrally with corresponding hook portions 62a by the use of any known bending technique. Those hook portions 62a are resiliently engaged with respective corner areas 86 in the rear surface of the battery receptacle 44, which are continued to respective end face of the guide recesses 59, when the repositionable contact holder 48 is mounted on the battery receptacle 44 with the planar anchoring portion 66 of the anchoring member 61 so positioned as to form a front surface of the battery receptacle 44.

Figure 6A:
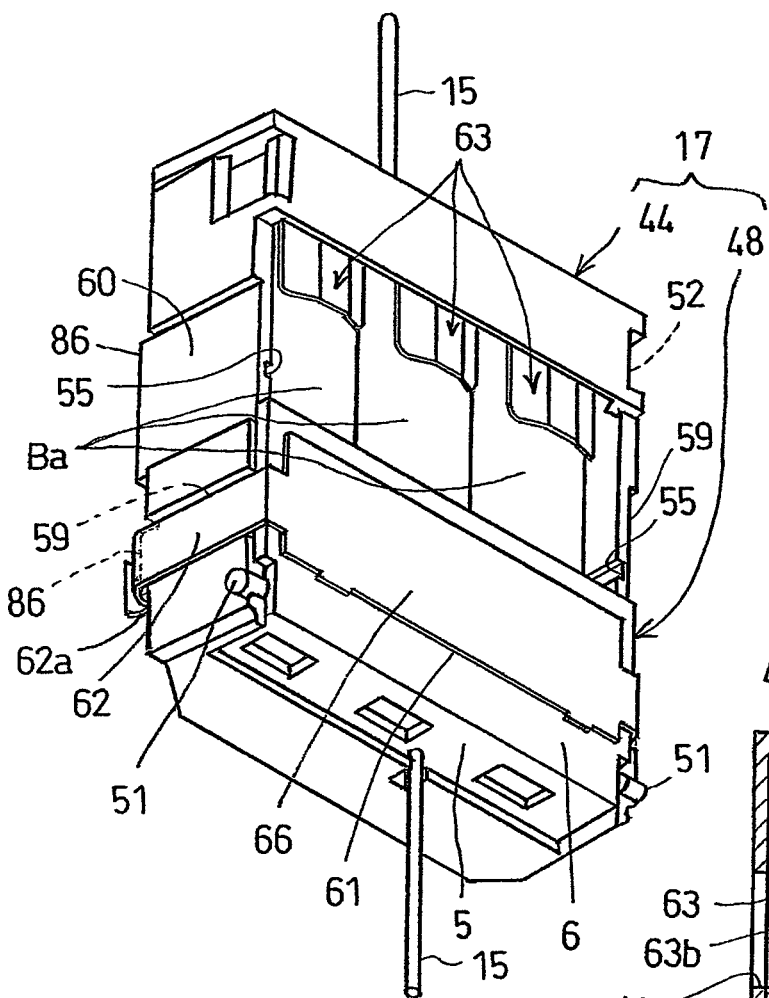
FIG. 6A is a perspective view showing the battery box having batteries accommodated therein.

FIG. 6A illustrates the battery box 17 in a condition accommodating the batteries Ba therein with the contact holder 48 removably mounted on the battery receptacle 44. The condition of the battery box 17 shown in FIG. 6A can be attained by inserting the three batteries Ba into the battery compartments 65 (best shown in FIG. 5) in the battery receptacle 44 and then mounting the contact holder 48 onto the battery receptacle 44. Specifically, when the contact holder 48 is mounted on the battery receptacle 44, the guide rails 58 and 58 at the opposite ends thereof are slidingly engaged in the respective guide grooves 53 and 53 (best shown in FIG. 5) and, at the same time, the legs 62 and 62 rigid with the contact holder 48 are slidingly engaged in the guide recesses 59, wherefore the hook portions 62a and 62a at the respective free ends of the legs 62 and 62 are finally forced to resiliently clasp the corner areas 86 in the rear surface of the battery receptacle 44 by the effect of a resilient restoring force accumulated in those legs 62 and 62 when the legs 62 and 62 then sliding in the corresponding guide recesses 59 have been urged outwardly of the battery receptacle 44.

Figure 6B:
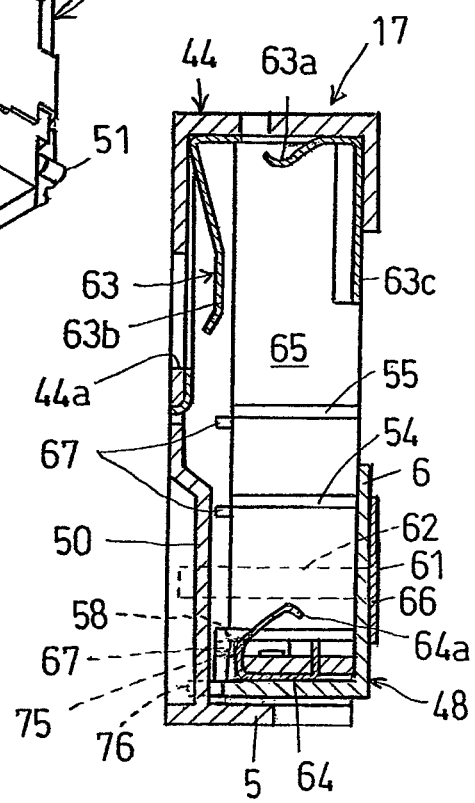
FIG. 6B is a schematic longitudinal sectional view showing the battery box shown in FIG. 6A.

FIG. 6B illustrates a longitudinal sectional view of the battery box 17 of FIG. 6A, i.e., an assembly of the battery receptacle 44 with the repositionable contact holder 48. Referring to FIG. 6B, the negative terminal member 63 disposed within the battery receptacle 44 is prepared by bending an electroconductive metal plate so as to represent a generally U-shaped configuration and is therefore made up of a common negative contact 63a, leaf spring portions 63b one for each of the battery compartments 65 and retaining pieces 63c, with the negative contact 63a intervening between the leaf spring portions 63b and the retaining pieces 63c.

Each of the leaf spring portions 63b is operable to apply a biasing force radially to the corresponding battery Ba, then accommodated within the respective battery compartment 65, towards the associated retaining piece 63c. On the other hand, each of the retaining pieces 63c is formed to represent a curved configuration so as to follow the curvature of the associated battery Ba and is cooperable with the corresponding leaf spring portion 63b to substantially immovably retain such battery Ba between the leas spring portion 63b and the retaining piece 63c.

Cooperable with the common negative contact 63a is a common positive contact 64a forming a part of a positive terminal member 64 made of an electroconductive metal and disposed within the contact holder 48 as best shown in FIG. 6B.

When the repositionable contact holder 48 is mounted on the battery receptacle 44, the two engagement edges 8 in the end wall 5 of the repositionable contact holder 48 best shown in FIG. 5 are engaged in the corresponding engagement cutouts 74 defined in the battery receptacle 44. Accordingly, the repositionable contact holder 48, when in addition to the engagement of the guide rails 58 in the guide grooves 53 the engagement edges 8 are received within the associated engagement cutouts 74, immovably retained in position so that the contact holder 48 will neither move nor displace in any vertical direction, as viewed in FIG. 6B, relative to the battery receptacle 44.

Accordingly, the repositionable contact holder 48 is retained in position to ensure firm contacts of the contacts 64a and 63a with the batteries Ba (best shown in FIG. 6A) against resilient restoring forces exerted respectively by the positive contacts 64a and the negative contacts 63a, which were once deformed during the mounting of the contact holder 48 onto the battery receptacle 44. In addition, the repositionable contact holder 48, when side faces 58a at tip end portions of the respective guide rails 58, which may confront in a direction opposite to the batteries Ba, are brought into contact with the associated engagement pieces 67, is further stably held in a mounted position against the resilient restoring forces exerted by the contacts 64a and 63b as best shown in FIG. 6B. At this time, the stepped areas 75 best shown in FIG. 5 is engaged with respective end faces of the engagement pieces 67 and the engagement projections 76 on the respective sides are held in contact with respective outer side face portions of the battery support beds 50, and, accordingly, the repositionable contact holder 48 is further stably retained in the mounted position.

As hereinbefore described with particular reference to FIG. 5, the opposite side walls of the battery receptacle 44 are formed with the guide grooves 53 to 55 at three locations along the longitudinal direction of the batteries Ba. Accordingly, the repositionable contact holder 48 can be detachably mounted on the battery receptacle 44 so as to selectively assume one of a plurality of, for example, three, battery positions on the battery receptacle 44 by slidingly inserting the guide rails 58 of the contact holder 48 into one of the guide grooves 53 to 55 thereby to enable the battery box 17 to selectively accommodate one of the batteries Ba of different in size or capacity as will be detailed with particular reference to FIGS. 7A to 7D.

As described above, the same battery box 17 can be employed for accommodating one of the different sizes of the batteries Ba when the repositionable contact holder 48 is selectively mounted on the battery receptacle 44 so as to assume one of the first to third battery positions.

Reference will now be made to FIGS. 7A to 7C illustrate the same battery box 17 in respective positions to accommodate the batteries of different sizes and FIG. 7D illustrates that the battery box 17 is in position to accommodate three sets of two series-connected batteries Ba3 each being of the same size as that of the battery shown in FIG. 7C.

Specifically, where the batteries Ba1 (for example, CR123A dry cells) having relatively large length and diameter are to be accommodated in the battery box 17 as shown in FIG. 7A, the repositionable contact holder 48 has to be mounted on the battery receptacle 44 with the guide rails 58 in FIG. 5 slidingly engaged in the intermediate guide grooves 54 in the side walls of the battery receptacle 44 and also with the legs 62 engaged in the guide recesses 60 in the battery receptacle 44. At this time, the legs 62 fast with the contact holder 48 are slidingly inserted into the respective guide recesses 60 in the battery receptacle 44 after having slid along side faces 60a in the side walls of the battery receptacle 44.

By so doing, the positive contact 64a of the positive terminal member 64 in the repositionable contact holder 48 and the negative contact 63a in the battery receptacle 44 are electrically connected with positive and negative electrodes of the accommodated batteries Ba1, allowing the batteries Ba1 ready to supply an electric power to the main unit 1. At this time, the leaf spring portions 63b of the negative terminal member 63 have their free ends driven into respective escape holes 44a, defined in the battery receptacle 44, as they are urged by the batteries Ba1 of the relatively large diameter against their own resiliencies.

As best shown in FIG. 7B, when the batteries Ba2 of the size and diameter, which are smaller than those of the batteries Ba1 referred to above, such as, for example, CR2 batteries are desired to be placed into the battery box 17, the repositionable contact holder 48 is mounted on the battery receptacle 44 with the guide rails 58, best shown in FIG. 5, slidingly engaged in the associated guide grooves 55 adjacent the negative contact 63a and with the legs 62 engaged in the associated guide recesses 60. At this time, the legs 62 are engaged in the associated guide recesses 60 adjacent the negative contact 63a after having slid along the other side faces 60b.

On the other hand, where the batteries Ba3 of the size slightly shorter than that of the batteries Ba2, such as, for example, ½AA batteries are desired to be placed in the battery box 17 as best shown in FIG. 7C, the repositionable contact holder 48 is mounted on the battery receptacle 44 with the guide rails 58, best shown in FIG. 5, slidingly engaged in the associated guide grooves 55 adjacent the negative contact 63a and with the legs 62 engaged in the associated guide recesses 60. In other words, the repositionable contact holder 48 is mounted on the battery receptacle 44 in a manner similar to that required in placing the batteries Ba2 as shown in FIG. 7B. In the case of the condition shown in FIG. 7B, the difference in length between each battery Ba2 and the corresponding battery Ba3 can be accommodated by deformation of the negative contact 63a and that of the positive contact 64a.

However, the battery box 17 employed in the practice of the present invention can accommodate the sets of two series-connected batteries Ba3 as shown in FIG. 7D. In this condition as shown in FIG. 7D, while one of the two series connected batteries Ba3 in each set is retained between the corresponding leaf spring portion 63b of the negative terminal member 63 and the retaining piece 63c of the same negative terminal member 63 and the other of the two series connected batteries Ba3 in each set is supported on the corresponding battery support bed 50, the repositionable contact holder 48 is mounted on the battery receptacle 44 with the guide rails 58 (best shown in FIG. 5) slidingly engaged in the guide grooves 53 remotest from the negative contact 63a in the battery receptacle 44 and with the legs 62 engaged in the guide recesses 59. With the repositionable contact holder 48 so mounted on the battery receptacle 44, such other of the two series connected batteries Ba3 in each set is sandwiched and is steadily supported between the corresponding battery support bed 50 and the lid member 6 of the contact holder 48.

Figure 8:
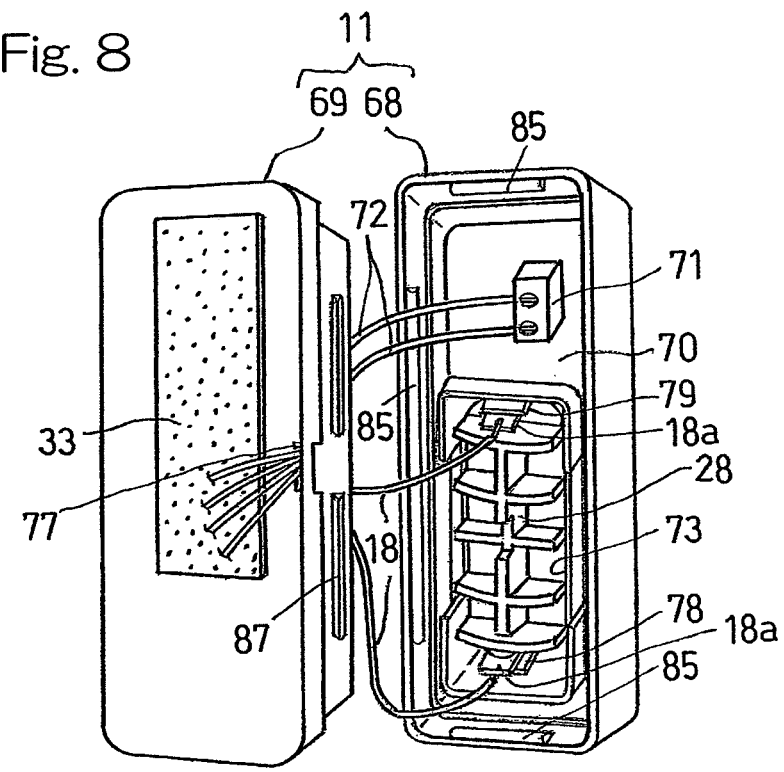
FIG. 8 is an exploded perspective view showing a wireless transmitter to be used in the intrusion detecting device.

Referring now to FIG. 8 showing an exploded perspective view of the wireless transmitter 11, the transmitter 11 shown therein includes a generally rectangular box-like transmitter casing made up of a transmitter receptacle 68 and a transmitter lid member 69. The transmitter receptacle 68 accommodates therein a printed circuit board 70 having various electronic component parts (not shown) mounted thereon to form a wireless transmitting circuit 13. The printed circuit board 70 also has mounted thereon a terminal member 71 which forms an input terminal member to which the human body detection signal, i.e., the signal indicative of detection of the unauthorized human body entering the warning area are supplied through the signal feed lines 72. Also, the transmitter receptacle 68 includes a battery mount 73 defined therein, which mount 73 accommodates therein at least one dummy battery 20 in place of a transmitter battery. The dummy battery 20 is made of an electrically insulating material such as, for example, a resinous material.

The dummy battery 28 has a size and a diameter which are the same as those of the transmitter battery (the real battery) and is placed within the battery mount 73 while contact pieces 18a and 18a, connected with free ends of the power supply lines 18 and 18, held in contact with a positive terminal 78 and a negative terminal 79 in the battery mount 73. Accordingly, in a condition with the contact pieces 18a and 18a sandwiched between the dummy battery 28 and the respective terminals 78 and 79, the contact pieces 18a and 18a are electrically connected with the positive and negative terminals 78 and 79.

Figure 9:
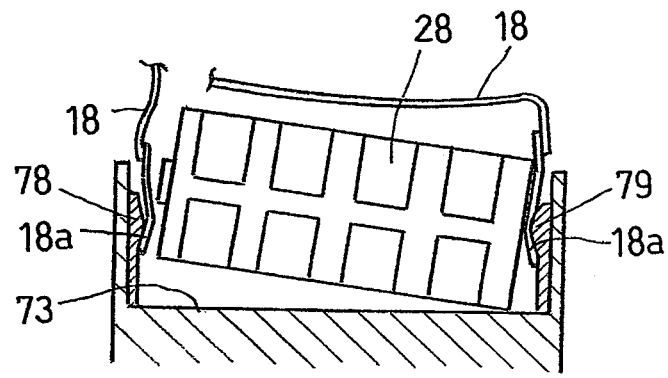
FIG. 9 is a schematic longitudinal sectional view showing one of dummy batteries being mounted on the wireless transmitter.

The two power supply lines 18 and the two signal feed lines 72, both connected with the circuit within the transmitter receptacle 68 as shown in FIG. 9, are drawn out of the transmitter casing through a lead-out hole 77, defined in the transmitter lid member 69, to the outside. The transmitter receptacle 68 and the transmitter lid member 69 are coupled with each other through the engagement between engagement portions 85, defined in the transmitter receptacle 68, and to-be-engaged portions 87 defined in the transmitter lid member 69.

In the conventional intrusion detecting device, it has been essential that when a battery used in the transmitter runs out, the transmitter receptacle 68 and the transmitter lid member 69 have to be separated from each other to thereby disassembly the transmitter 11, thus requiring a difficult and time consuming work to replace the battery in the transmitter. In contrast thereto, in the intrusion detecting device designed in accordance with the embodiment discussed hereinbefore, placement of the dummy battery 28 in place of the real, transmitter battery is sufficient and the transmitter 1 is no longer required to be disassembled.

In the afore-mentioned embodiment the arrangement has been made in which the contact pieces 18a and 18b at the respective free ends of the power supply lines 18 and 18 employed in the embodiment are electrically connected with the positive terminal 78 and the negative terminal 79 while the contact pieces 18a and 18b are sandwiched between the dummy battery 28 and the respective terminals 78 and 79. In place of such arrangement, the contact pieces 18a and 18b at the respective free ends of the power supply lines 18 and 18 may be integrally soldered or welded to the dummy battery 28, in which case the power supply lines 18 and 18 can be easily fitted to the wireless transmitter 11 in a connected fashion when the dummy battery 28 is placed in the battery mount 73 in the transmitter 11, thus facilitating the handlability of the power supply lines 18 and 19.

Figure 2:
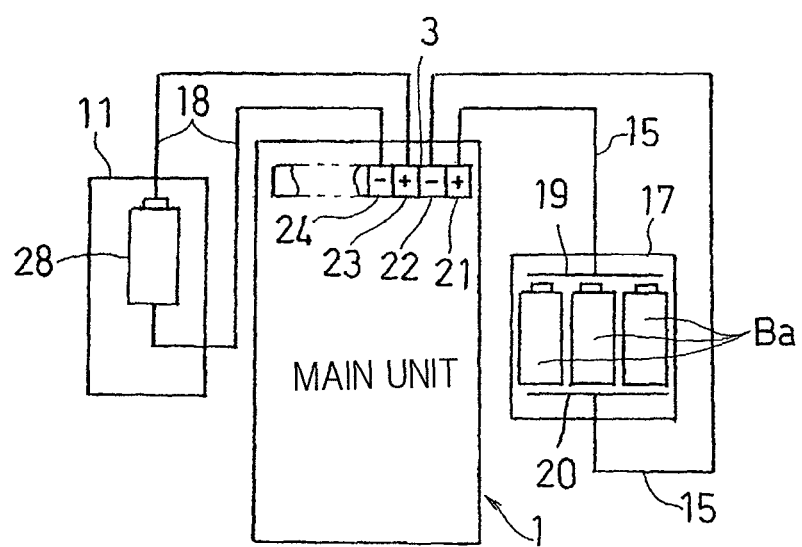
FIG. 2 is a schematic diagram showing a power supply system in the intrusion detecting device.

On the other hand, regarding the supply of the electric power from the batteries Ba in the battery box 17 to the main unit 1 shown in FIG. 2, in place of the arrangement in which the positive and negative contacts 63a and 64a of the battery box 17 (FIG. 6B) are connected respectively with the positive and negative power input terminals 21 and 21 of the electric connector terminal 3 in the main unit 1, the system may be employed in which the battery box 17 and the main unit 1 can be separably connected with each other by means of a plug-and-socket connection means, in which case the electric power supply lines 15 and 15 can be advantageously dispensed with, thus accomplishing a simplification.

Figure 10:
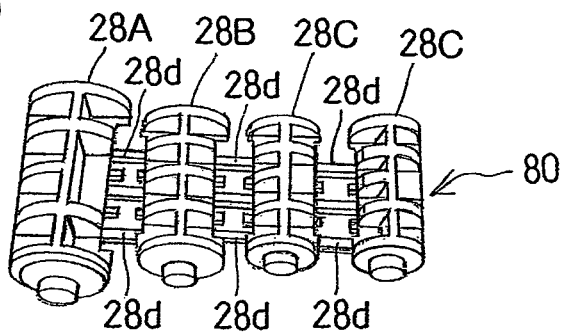
FIG. 10 is a schematic perspective view showing a set of the dummy batteries to be used in the wireless transmitter.

As shown in FIG. 10, a dummy battery set 80 comprised of a plurality of dummy batteries 28A, 28B and 28C of different lengths and diameters that are connected together by means of connecting pieces 28d is prepared in readiness for or in anticipation of the actual use in the particular transmitter 11 of the structure described hereinbefore. Accordingly, where an arbitrarily chosen one of the various transmitters 11 now in the market as universal products is employed, one of the dummy batteries 28A to 28C suitable to the battery mount 73 in the arbitrarily chosen transmitter 11, may be chosen out from the dummy battery set 80 and be then mounted on the battery mount 73 in such chosen transmitter 11.

Figure 11:
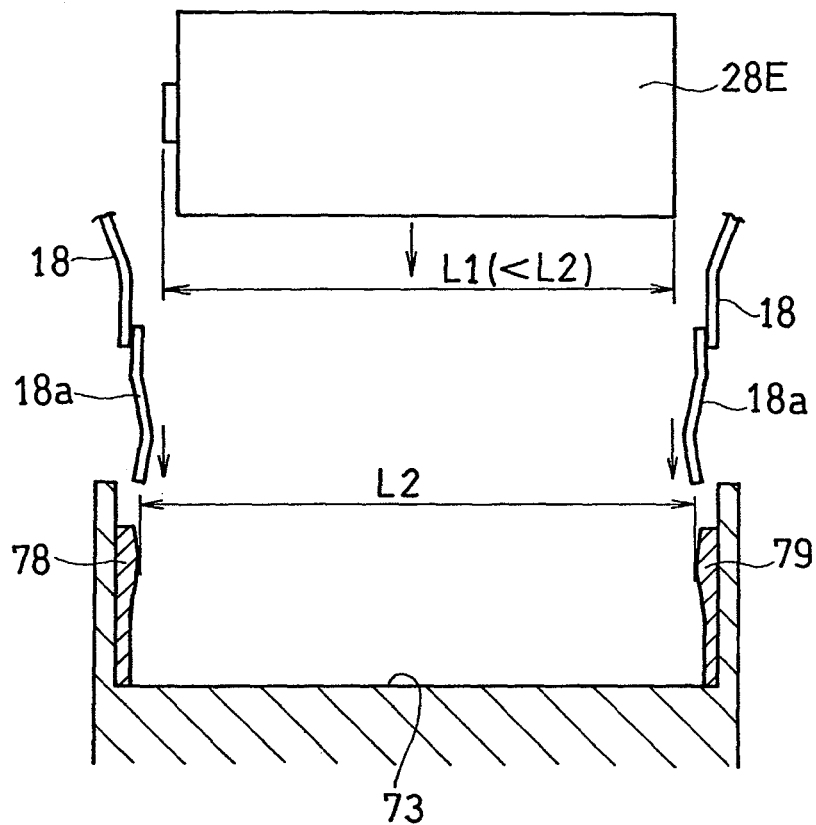
FIG. 11 is a schematic longitudinal sectional view showing a modified form of the dummy battery in the wireless transmitter.

A modified form of the dummy battery shown in FIG. 11, that is, a dummy battery 28E is of a design in which the length thereof, that is, the length L1 between positive and negative poles of such dummy battery 28E is chosen to be somewhat smaller than the real batteries used in the transmitter. In other words, the commercially available standard battery has a length somewhat greater than the distance L2 between positive and negative terminals 78 and 79 with no battery mounted for receiving any of the batteries used in the transmitter 11 and, therefore, such battery is snugly and neatly mounted in place between the positive and negative terminals 78 and 79 in the battery mount 73 against respective biasing forces of the positive and negative terminals 78 and 79.

However, since, in contrast thereto, the dummy battery 28E has the length L1 smaller than the distance L2 between the positive and negative terminals 78 and 79 in the battery mount 73 by, say, about 0.5 to 1 mm (L1<L2) in dependence on the thickness of the contact piece 18a at the free end of each of the electric power supply lines 18. Accordingly, it is possible to avoid the possibility that when the dummy battery 28E is being mounted onto the battery receptacle 73, an undesirably excessive pressing force may act on each of the positive and negative terminals 78 and 79.

It is however to be noted that in place of the dummy battery 28E, an ordinary or real battery for use in the transmitter 11 may be used with its positive and negative poles held in electrical contact with the positive and negative terminals 78 and 79 in the battery receptacle 73. In such case, not only is the dummy battery 28 required no longer, but also the electric power source capacity can be advantageously increased by a quantity corresponding to the capacity of the ordinary battery. In such case, the battery length may somewhat increase by a value greater than the dummy battery length L1, but the increment can be accommodated when the positive terminal 78 is deformed outwardly.

Figure 12A:
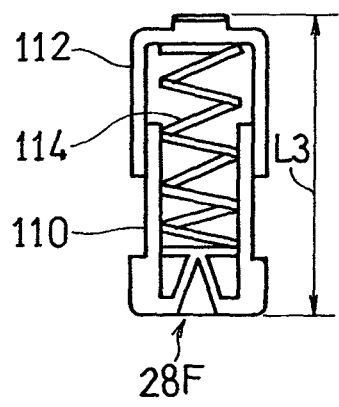
FIGS. 12A and 12B are schematic longitudinal sectional views showing a further modified form of the dummy battery in different operative positions.

A dummy battery 28F according to another modification shown in FIG. 12A is of a telescopically expandable type that is expandable in a direction lengthwise thereof. This dummy battery 28F is made up of a first cylindrical body 110, having a negative pole which is one of the opposite battery poles, a second cylindrical body 112 having a positive pole, which is the other of the opposite battery poles, and capped onto the first cylindrical body 110, and an elastic member 114 such as, for example, a coil spring accommodated in part within the first cylindrical body 110 and in part within the second cylindrical body 112 to bias one of the first and second bodies 110 and 112 in a direction away from the other of the first and second bodies 110 and 112. With the dummy battery 28F so constructed as described above, the dummy battery 28F in a free condition has a length L3 which is greater than the distance L2 between the positive and negative terminals 78 and 79 in the transmitter 11 shown in FIG. 11 or the distance L2 minus the sum of the respective thicknesses of the contact pieces 18a and 18a.

Figure 12B:
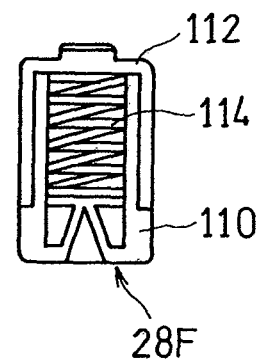

When in use, the dummy battery 28F in a constricted state against the biasing force of the elastic member 114 as shown in FIG. 12B is first placed within the battery mount 73 and is then allowed to assume an expanded state, as shown in FIG. 12A, by the effect of the biasing force of the elastic member 114, thereby causing the poles of the dummy battery 28F to contact the positive and negative terminals 78 and 79 in the battery mount 73. In such a manner the dummy battery 28F is snagly mounted on the battery mount 73.

Even in any one of the respective modifications shown in and described with reference to FIG. 11 and FIGS. 12A and 12B, the contact pieces 18a and 18a at the free ends of the power supply lines 18 and 18 can be jointed with the dummy battery 28E or 28F to provide an integrated structure.

Figure 13:
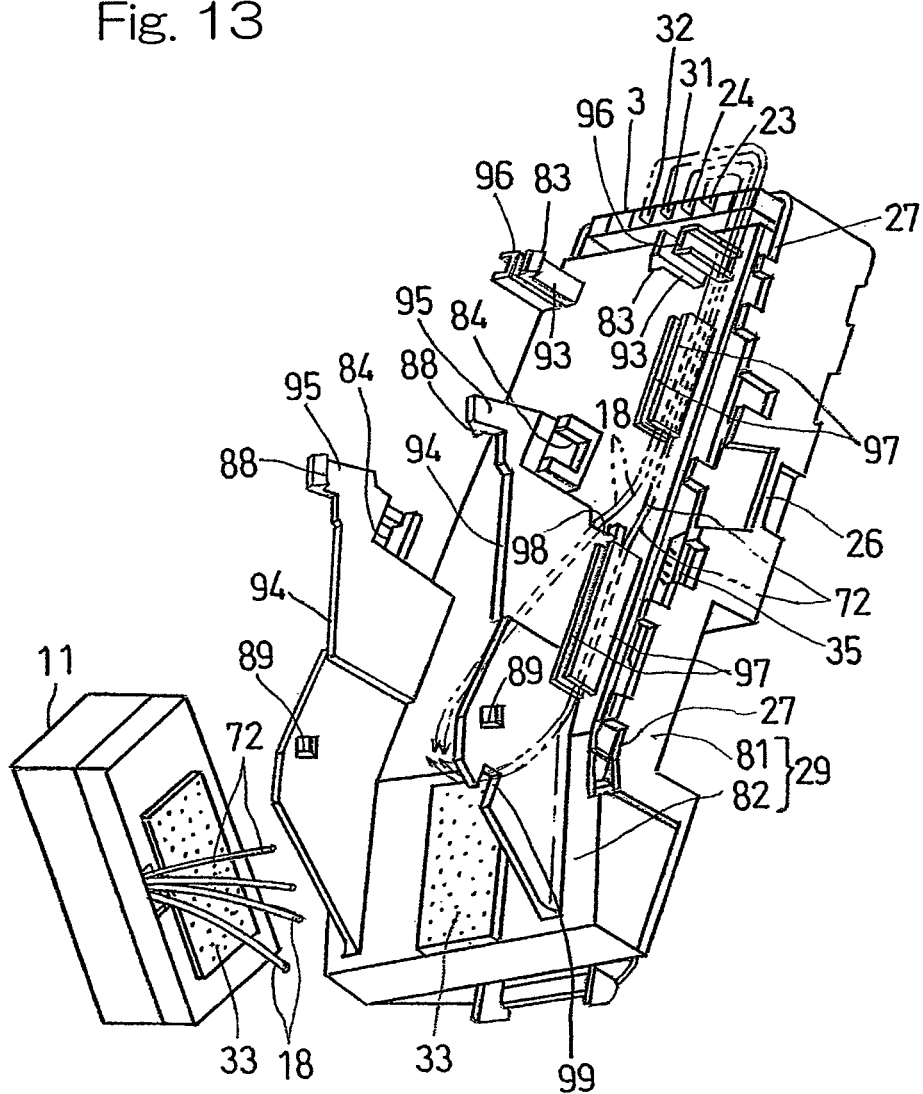
FIG. 13 is an exploded perspective view showing a unit holder and the transmitter in the intrusion detecting device.

Hereinafter, the manner of mounting of the battery box 17 and the transmitter 11 onto the rear surface of the unit holder 29 will be described in detail. As shown in FIG. 13, the generally rectangular unit holder 29 is of a structure including a holder 81 having the unit body 1U built therein as best shown in FIG. 3, and a back covering 82 for closing a rear opening of the holder body 81, and a rear surface area of the unit holder 29, where the battery box 17 and the transmitter 11 are fitted, defines an outer surface of the back covering 82. This back covering 82 has a pair of pawl pieces 93 formed on respective sides of an upper portion thereof as viewed in FIG. 13, which pawl pieces 93 have respective pawls 83 formed at their tip ends and laterally opposite to each other. In an area on the opposite sides of the back covering 82 and ranging from a portion intermediate in a longitudinal direction down to a lower end portion thereof, a pair of upright walls 94 lying substantially perpendicular to the rear surface of the back covering 82 are formed, each having an upper end portion formed with an upper engagement hole 84 defined therein.

Also, each of the upright walls 94 has a respective pawl piece 95 formed therein so as to protrude upwardly of the corresponding upper engagement hole 84, which piece 95 has a tip end portion formed with an engagement pawl 88 of the same shape as that of the engagement pawl 83, with the engagement pawl 88 in one of the upright walls 94 being opposed to and laterally aligned with that in the other of the upright walls 94. In addition, a lower engagement hole 89 of the same shape as that of the upper engagement hole 84 described above is formed in each of opposite lower side portions of the upright walls 94. The lower engagement claws 88 and the engagement holes 89 are so arranged as to be spaced from each other a distance equal to the spacing between the upper engagement claws 83 and the engagement holes 84. The engagement pawls 83 and 88 form engagement elements and the engagement holes 84 and 89 form to-be-engaged elements. Those elements 83, 88, 84 and 89 altogether define an engagement of the unit holder 29.

A protective rib 96 is formed at a location outwardly of each of the upper pawl pieces 93 in the back covering 82 with a slight gap left between it and the respective pawl piece 93, which rib 96 serves to avoid breakage of the pawl piece 93 due to a considerable deformation thereof. Upper and lower pairs of small upright walls 97 are formed in one side portion of the outer surface of the back covering 92 and are spaced a predetermined distance from each other. Also, insertion cutouts 98 and 99 are formed in one of the upright walls 94 at respective locations adjacent a root of an upper end thereof and adjacent a lower end thereof.

Figure 14A:
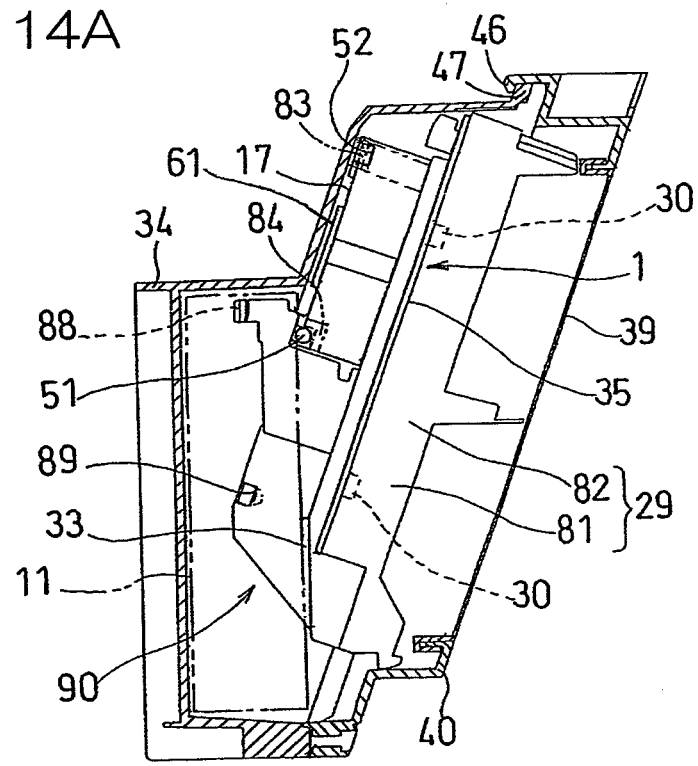
FIGS. 14A and 14B are schematic left side views, with a portion cut out, showing the transmitter and the battery box in different relative arrangements.

When the transmitter 11 is mounted onto the outer surface of the back covering 82 through the previously described releasable fastening strap 33 trademarked "Magic Tape" or "Velcro Strap", the signal lines 72 and 72, drawn outwardly from the transmitter 11 as shown by the double dotted lines, have to be drawn to signal output terminals 31 and 32 in the electric connector terminal 3 after having been drawn outwardly of the upright walls 94 through the lower cutouts 99 and then successively passed through a space delimited between the small upright walls 97 and 97 and outwardly of the protective ribs 96. On the other hand, the power supply lines 18 and 18 are drawn to the positive and negative power output terminals 23 and 24 in the electric connector terminal 3 through the space between the upper small upright walls 97 and 97 after having been drawn outwardly of the upright walls 94 through the upper cutouts 98. By so doing, the pair of the signal lines 72 and the pair of the power supply lines 18 are held in position between the paired small upright walls 97 and 97 and accordingly, the unit holder 29 carrying the battery box 17 and the transmitter 11 can be easily mounted on the base body 34.

Where the transmitter 11 of a type not so long is to be fitted as shown in FIG. 14A, the two projections 51 and 51 in the battery box 17 are engaged in the upper two engagement holes 84 and 84 in the back covering 82, while the two engagement holes 52 and 52 in the battery box 17 are engaged with the engagement pawls 83 and 83 in the back covering 82, to thereby fit the battery box 17 to the back covering 82 in a fashion contacting the upper outer surface of the back covering 82. On the other hand, the transmitter 11 is fitted to the first mounting position 90 of the lower outer surface of the back covering 82, encompassed by the double dotted lines, by the use of the releasable fastening strap 33 to allow it to be positioned in side-by-side relation with the battery box 17. The two PIR sensors 30 and 30 best shown in FIG. 3 are mounted on the printed circuit substrate 35 and cooperate with the various signal processing circuits, also disposed on that printed circuit substrate 35, to define the human body detector 2 best shown in FIG. 1. The human body detector 2 and the microcomputer 9 are mounted on the printed circuit substrate 35 to thereby constitute the unit body 1U, which is in turn accommodated within the unit holder 29.

Figure 14B:
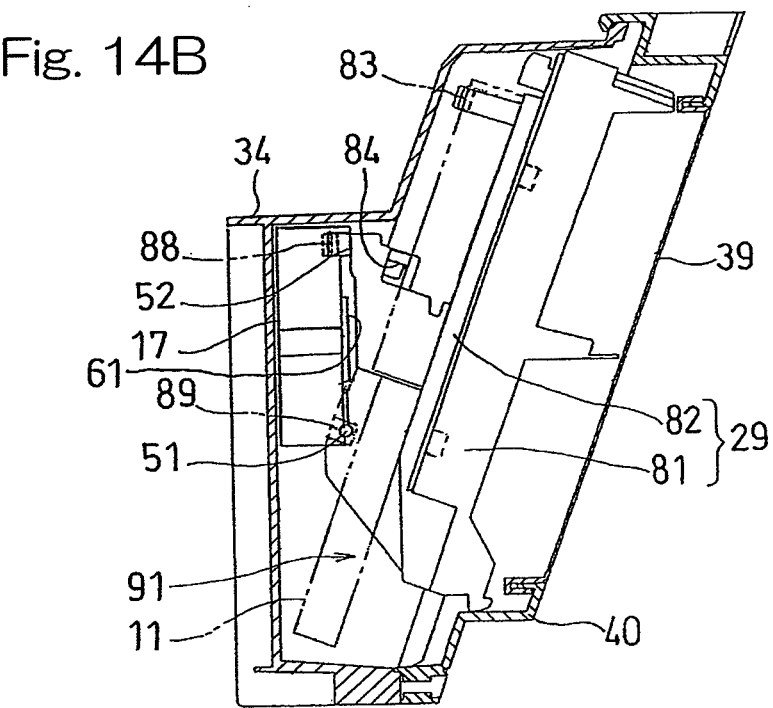

On the other hand, where the transmitter of a long size is to be mounted, as shown in FIG. 14B, the battery box 17 is placed in a reverse arrangement to allow the surface of contact with the back covering 82 in the arrangement shown in FIG. 14A to form a rear surface and the two projections 51 and 52 in the battery box 17 are engaged in the lower two engagement holes 89 and 89 in the back covering 82, while the two engagement holes 52 and 52 are engaged with the two engagement pawls 88 and 88 in the back covering 82, to thereby mount the battery box 17 in a fashion apart from the lower outer surface of the back covering 2. Accordingly, a mounting space can be secured between the battery box 17 and the outer surface of the back covering 82 and, therefore, the long transmitter 11 is fitted at the second mounting position 91 within this mounting space as shown by the double dotted lines.

As best shown in FIG. 9, when the power supply lines 18 are to be electrically connected with the positive and negative terminals 78 and 79 in the battery mount 73 of the transmitter 11, respectively, the foregoing embodiment of the present invention makes use of a first structure, in which the two contact pieces 18a are fitted to the respective free ends of the power supply lines 18 and sandwiched between the dummy battery 28 and the respective terminals 78 and 79. However, the present invention can also make use of a second structure which will now be described.

Figure 15A:
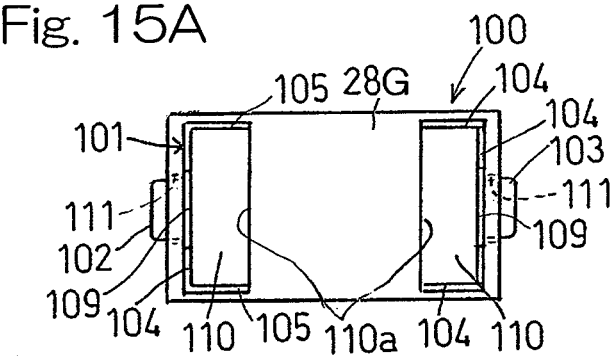
FIG. 15A is a schematic top plan view showing a terminal equipped dummy body that is used in the transmitter.
Figure 15B:
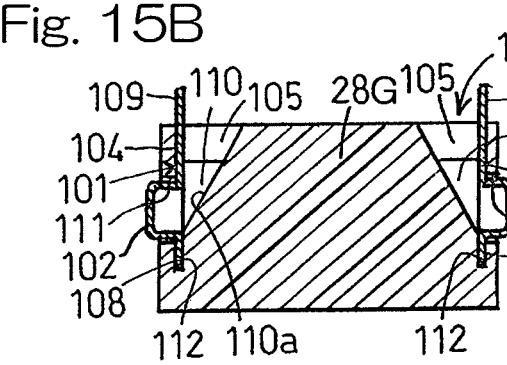
FIG. 15B is a schematic longitudinal sectional view showing the terminal equipped dummy body that is used in the transmitter.

Specifically, referring to FIGS. 15A and 15B showing a top plan view and a longitudinal view of the second structure, a terminal fitted dummy body 100 is prepared, in which positive and negative electrodes or pole elements 102 and 103 are mounted on a dummy battery 28G. This terminal fitted dummy body 100 is inserted into the battery mount 73 in the transmitter 11 in a fashion in which the free ends of the power supply lines 18 are jointed and hence integrated together with the terminal fitted dummy body 100, followed by electric connection of the power supply ones 18 with the positive and negative terminals 78 and 79 in the battery mount 73, respectively. The terminal fitted dummy body 100 is of a structure in which a terminal member 101 is mounted on the dummy battery 28G. The terminal member 101 is made of an electroconductive member such as, for example, an aluminum plate and is of one piece construction including, as best shown in FIG. 15D, a rectangular terminal plate 104, the positive and negative pole elements 102 and 103 protruding laterally outwardly from a center portion of the terminal plate 104, two retaining pieces 105 and 105 protruding from opposite upper side edge portions of the terminal plate 104 in a direction perpendicular to the terminal plate 104, a support piece 108 extending downwardly from a lower intermediate edge portion of the terminal plate 104, and a connecting piece 109 projecting upwardly from an upper intermediate edge portion of the terminal plate 104. The connecting piece 109 is formed with a connection hole 109a and a lead line 18b at an end portion of the power supply line 18 is, after having been inserted through this connection hole 109a, connected electrically with this connection piece 109 and, hence, the terminal plate 104.

On the other hand, as best shown in FIG. 15B, the dummy battery 28G made of a resinous material has two retaining ditches 110 of a triangular shape, as viewed in a longitudinal section, open at an outer peripheral surface thereof at respective locations adjacent opposite ends thereof and also has two insertion holes 111 and two support slots 112, both defined in the dummy battery 28G The two insertion holes 111 extend from the associated retaining ditches 110 towards respective center portions of opposite end faces of the dummy battery 28G and the two support slots 112 are communicated with inner tip end portions of the respective retaining ditches 110 and extend parallel to the end faces.

Figure 15C:
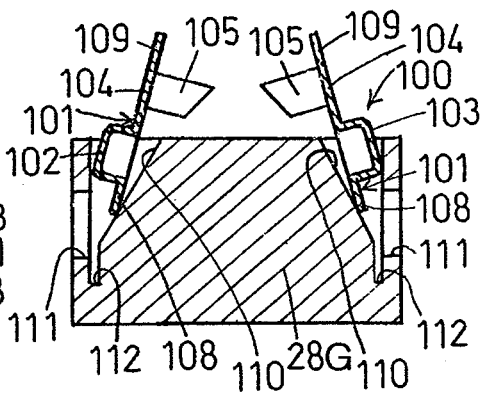
FIG. 15C is a schematic longitudinal sectional view showing how the terminal equipped dummy body is assembled.
Figure 15D:
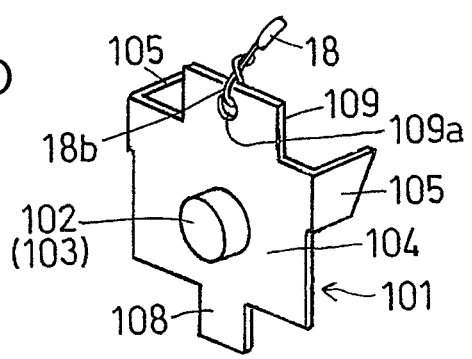
FIG. 15D is a schematic perspective view showing terminal members used in the terminal equipped dummy body.

As best shown in FIG. 15C, each of the terminal members 101 is, while inclined, inserted into the corresponding retaining ditch 110, the support piece 108 is inserted also into such retaining ditch 110, followed by insertion of the positive pole element 102 or the negative pole element 103 into the corresponding insertion hole 111 to thereby allow the retaining piece 105 to engage with an inclined face 110a of the retaining ditch 110. By so doing, each of the terminal members 101 can be mounted on the dummy battery 28G to complete the terminal fitted dummy body 110.

Figure 16:
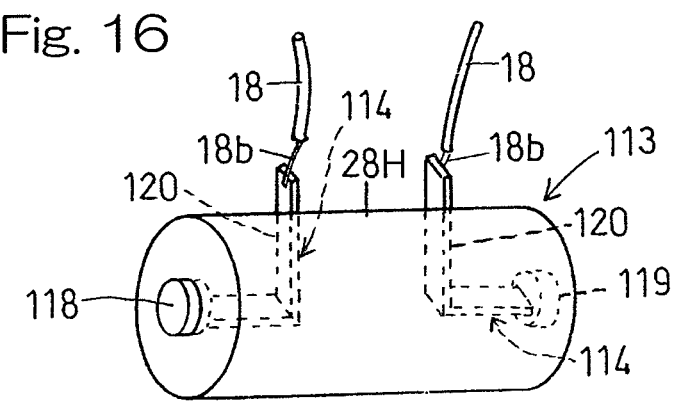
FIG. 16 is a schematic perspective view showing a modified form of the terminal equipped dummy body.

FIG. 16 illustrates a perspective view of a modified form of the terminal fitted dummy body 113. This terminal fitted dummy body 113 is of one piece construction formed by the use of any known insert molding technique, in which terminal members 114, each made up of a positive pole element 118 or a negative pole element 119 and a connecting piece 120, is substantially embedded in a dummy battery 28H. The positive pole element 118 or the negative pole element 119 and the corresponding connecting piece 119 have respective free ends exposed to the outside of the dummy battery 28H. A portion of each of the connecting pieces 120 exposed to the outside of the dummy battery 28H has a lead line 18b at the free end of the corresponding power supply line 18 soldered thereto.

With the present invention having been fully described, it is to be noted that the present invention is not necessarily limited to the type having the main unit of the passive infrared ray detecting system, but is applicable to the main unit of the active infrared ray detecting system. In addition, unless otherwise departing from the scope of the present invention, various addition, alterations and/or deletions can be made to the present invention and, accordingly, such various addition, alterations and/or deletions are to be included within the spirit of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Main unit
1U . . . Unit body
11 . . . Transmitter
17 . . . Battery box
18 . . . Power supply line
28, 28A to 28C, 28E to 28H . . . Dummy battery
29 . . . Unit holder
30 . . . PIR sensor (Detecting element)
34 . . . Base body
40 . . . Lens-fitted covering lid
44 . . . Battery Receptacle
48 . . . Repositionable contact holder
51 . . . Projection (To-be-engaged portion)
52 . . . Engagement hole (To-be-engaged portion)
61 . . . Anchoring member
62 . . . Leg
63a . . . Negative contact
63b . . . Leaf spring portion (Spring element)
63c . . . Retaining piece
64 . . . Positive terminal member
64a . . . Positive contact
66 . . . Anchoring portion
73 . . . Battery mount
78 . . . Positive terminal (Electrode terminal)
79 . . . Negative terminal (Electrode terminal)
83, 88 . . . Engagement pawl (Engagement element)
84, 89 . . . Engagement hole (To-be-engaged member)
90 . . . First mounting position
91 . . . Second mounting position
102, 118 . . . Positive pole member (Electrode)
103, 119 . . . Negative pole member (Electrode)
Ba, Ba1 to Ba3 . . . Battery

What is claimed is:

1. An intrusion detecting device comprising:
a main unit including a detecting element for detecting a human body;
a battery detachably mounted on the main unit for supplying an electric power to the main unit;
a power supply line for supplying an electric power from the battery to a wireless transmitter for transmitting wireless an output signal of the main unit, the wireless transmitter being adapted to be mounted on an outer surface of the main unit; and
a dummy battery having an electricallly insulating property, the dummy battery being adapted to be fitted to a battery mount of the transmitter together with the power supply line in place of a battery for the transmitter.

2. The intrusion detecting device as claimed in claim 1, in which the dummy battery has a length set to a value smaller than the battery of the transmitter.

3. The intrusion detecting device as claimed in claim 1, in which the dummy battery is telescopically expandable in a direction lengthwise thereof.

4. The intrusion detecting device as claimed in claim 1, in which the power supply line and the dummy battery are jointed together and is hence integrated with each other.

5. The intrusion detecting device as claimed in claim 1, in which a contact piece capable to be connected with a battery of the transmitter is fitted to the power supply line.

6. The intrusion detecting device as claimed in claim 1, further comprising a base body for detachably retaining the main unit and a lens detachably fitted to the base body for covering a front surface of the main unit.

7. The intrusion detecting device as claimed in claim 1, further comprising a battery box for holding the battery.

8. The intrusion detecting device as claimed in claim 7, in which the battery box is detachably mounted on a rear surface of the main unit.

9. The intrusion detecting device as claimed in claim 8, in which the transmitter is disposed on a rear surface of the main unit, and the battery box is positioned in side-by-side relation with the transmitter when at a first mounting position, but when at a second mounting position, defines a mounting space for the transmitter at a location spaced from the rear surface of the main unit, the mounting space being defined between the battery box and the rear surface.

10. The intrusion detecting device as claimed in claim 7, in which the main unit is provided with an engagement element and the battery box is provided with a to-be-engaged element engageable with the engagement element.

11. The intrusion detecting device as claimed in claim 7, in which the battery box is capable of accommodating a plurality of batteries of different diameters or lengths.

12. The intrusion detecting device as claimed in claim 11, in which the battery box comprises a spring element for applying a biasing force to the battery in a direction radially of such battery and a retaining piece for retaining the battery against the biasing force in a direction radially thereof.

13. The intrusion detecting device as claimed in claim 11, in which the battery box further comprises a repositionable contact holder, having a contact engageable with one of electrodes of the battery, for selectively fitted at one of a plurality of different positions in a direction lengthwise of the battery for accommodating one of batteries of different lengths.

14. The intrusion detecting device as claimed in claim 13, in which the repositionable contact holder comprises a contact member having the contact and an anchoring member for selectively engaging a battery receptacle of the battery box at one of the plurality of the different positions in the lengthwise direction.

15. The intrusion detecting device as claimed in claim 14, in which the anchoring member comprises a generally U-shaped plate member and includes an anchoring portion fitted to the repositionable contact holder, and a pair of legs extending from opposite ends of the anchoring portion in a direction perpendicular to the anchoring portion and in which each of the legs is formed with a hook portion at a free end thereof, the anchoring portion is positioned on a front surface side of the battery receptacle and the hook portion is engaged with a corner area in a rear surface of the battery receptacle.

* * * * *